United States Patent [19]

Kubo et al.

[11] Patent Number: 5,066,423

[45] Date of Patent: Nov. 19, 1991

[54] CONDUCTIVE CERAMIC SINTERED BODY

[75] Inventors: Yutaka Kubo, Yasugi; Hisao Hara, Kumagaya, both of Japan

[73] Assignee: Hitachi Metals, Ltd., Tokyo, Japan

[21] Appl. No.: 286,009

[22] Filed: Dec. 19, 1988

[30] Foreign Application Priority Data

Dec. 24, 1987 [JP] Japan .................. 62-328127
Sep. 22, 1988 [JP] Japan .................. 63-238281

[51] Int. Cl.$^5$ .................. H01B 1/04; C04B 35/56; C04B 35/58
[52] U.S. Cl. .................. 252/516; 501/89; 501/92; 501/97
[58] Field of Search .................. 501/87, 88, 89, 92, 501/96, 97, 98; 252/516

[56] References Cited

U.S. PATENT DOCUMENTS

| | | | |
|---|---|---|---|
| 3,813,252 | 5/1974 | Lipp | 501/97 |
| 3,890,250 | 6/1975 | Richerson | 501/97 |
| 4,605,633 | 8/1986 | DeAngelis | 501/98 |
| 4,613,455 | 8/1986 | Suzuki | 501/97 |
| 4,659,508 | 4/1987 | Higuchi et al. | 501/98 |

FOREIGN PATENT DOCUMENTS

| | | | |
|---|---|---|---|
| 0250593 | 12/1985 | European Pat. Off. . | |
| 0175041 | 3/1986 | European Pat. Off. | 501/97 |
| 3530103 | 3/1987 | Fed. Rep. of Germany . | |
| 60-33265 | 2/1960 | Japan . | |
| 57-129873 | 8/1982 | Japan | 501/98 |
| 57-188453 | 11/1982 | Japan . | |
| 57-200265 | 12/1982 | Japan . | |
| 58-084914 | 5/1983 | Japan | 501/98 |
| 59-102862 | 6/1984 | Japan | 501/92 |
| 59-207881 | 11/1984 | Japan | 501/98 |
| 60-033263 | 2/1985 | Japan | 501/97 |
| 60-046973 | 3/1985 | Japan | 501/92 |
| 60-60983 | 4/1985 | Japan . | |
| 60-200863 | 10/1985 | Japan | 501/97 |
| 60-260471 | 12/1985 | Japan | 501/92 |
| 62-140386 | 6/1987 | Japan . | |
| 0386873 | 6/1973 | U.S.S.R. | 501/92 |

OTHER PUBLICATIONS

N. Uchida and M. Koizumi, "Fabrication of Si$_3$N$_4$ Ceramics with Metal Nitride Additives by Isostatic Hot-Pressing", J. Am. Ceram. Soc., 68[2] C-38-C-40 (1985).

*Primary Examiner*—Mark L. Bell
*Assistant Examiner*—Anthony J. Green

[57] ABSTRACT

A conductive ceramic sintered body substantially free from large variation of electric resistivity, which consists essentially of: (a) a silicon nitride-base ceramic as a matrix; (b) 10-70 volume % of a first conductive material which consists of one or more conductive compounds selected from carbides, nitrides, oxides and their composite compounds of transition metals in Groups IVa, Va and VIa of the Periodic Table; and (c) 0.1-50 volume % of a second conductive material consisting of SiC; the first conductive material and the second conductive material serving to form paths for electric conduction.

7 Claims, 2 Drawing Sheets (MAGNIFICATION: 12,000)

(MAGNIFICATION: 40,000)

CONDUCTIVE CERAMIC SINTERED BODY

BACKGROUND OF THE INVENTION

The present invention relates to a conductive ceramic sintered body containing two types of conductive materials having different electric resistivities, the balance of which is essentially composed of silicon nitride and/or sialon.

Silicon nitride-base ceramics, such as silicon nitride based on $\alpha$- or $\beta$-Si$_3$N$_4$, $\beta$-sialon shown by the formula: Si$_{6-z}$Al$_z$O$_z$N$_{8-z}$ ($0 < z \leq 4.2$), $\alpha$-sialon shown by the formula: M$_x$(Si,Al)$_{12}$(O,N)$_{16}$, wherein $x < 2$, M represents Li, Mg, Ca, Y, or a rare earth element except for La and Ce, and their composite compounds, have excellent high-temperature strength and oxidation resistance, small thermal expansion coefficient and extremely good heat shock resistance. Accordingly, they have been being used for various applications in recent years. They are, however, extremely difficult to machine. One way to machine such ceramics is a discharge machining method, and various proposals were made to enable their discharge machining by imparting electric conductivity to them (See, for instance, Japanese Patent Laid-Open Nos. 57-188453, 57-200265, 59-207881, 60-33265, etc.) In addition, it was proposed to use such conductive ceramics as heater materials (Japanese Patent Laid-Open Nos. 60-60983 and 62-140386).

In the silicon nitride or sialon having electric conductivity, carbides, nitrides, etc. of transition metals in Groups IVa, Va and VIa of the Periodic Table are used.

However, most of these conductive materials have an electric resistivity on the level of $10^{-5} \Omega$.cm. For instance, electric resistivity is $4.0 \times 10^{-5} \Omega$.cm for TiN, $1.6 \times 10^{-5} \Omega$.cm for TiC and $1.8 \times 10^{-5} \Omega$.cm for ZrN. Therefore, an electric resistivity of as high as $10^{-3} \Omega$.cm or more cannot be obtained without reducing the amount of conductive materials. However, since this makes it impossible to form sufficient paths for electric conduction in the sintered body, slight variations of the contents of the conductive material lead to drastic changes in the electric resistivity of the sintered body. As a result, it is extremely difficult to obtain a sintered body with stable electric resistivity which does not suffer from large variations. Incidentally, the variations in the electric resistivity are likely to appear among production lots, sintered bodies, and even in a single sintered body.

The ceramic sintered bodies disclosed by Japanese Patent Laid-Open Nos. 57-188453, 57-200265, 59-207881 and 60-33265 have an electric resistivity which tends to vary widely at high electric resistances, and no measure has been proposed to eliminate such variations.

On the other hand, conductive compounds such as carbides, nitrides, etc. of transition metals in Groups IVa, Va and VIa of the Periodic Table generally have high melting points, so they are less susceptible to deterioration even by high-temperature sintering. However, these compounds are inferior to the silicon nitride or sialon with respect to oxidation resistance. Accordingly, their maximum use temperatures are inevitably restricted.

As described above, the silicon nitride or the sialon having electric conductivity are excellent ceramic materials, but they are not free from the above-mentioned problems.

OBJECT AND SUMMARY OF THE PRESENT INVENTION

An object of the present invention is, therefore, to provide a conductive ceramic sintered body which has electric resistivity not susceptible to variation at high electric resistances, and excellent oxidation resistance.

To reduce the variation in electric resistivity, particularly at high electric resistance, it is necessary to add conductive materials which can keep the high electric resistivity of the ceramics even when they are present in large amounts, but this cannot be achieved by using, as conductive materials, only compounds such as carbides, nitrides, etc. of transition metals of Groups IVa, Va and VIa of the Periodic Table.

Thus, the inventors have expected that the above object can be achieved by combining conductive materials such as carbides, nitrides, etc. of the transition metals of Groups IVa, Va and VIa of the Periodic Table with a conductive material having higher electric resistivity than the above conductive materials. As a result of intense research based on the above expectation, the inventors have found that the addition of both the conductive compounds of carbides, nitrides, etc. of transition metals of Groups IVa, Va and VIa of the Periodic Table and SiC can provide a ceramic sintered body with electric resistivity which is not susceptible to variation at a high electric resistances, and further with improved resistance to oxidation. The present invention is based on these findings.

Thus, the conductive ceramic sintered body according to the present invention consists essentially of a silicon nitride-base ceramic as a matrix: 10–70 volume % of a first conductive material which consists of one or more conductive compounds selected from carbides, nitrides, oxides and their composite compounds of transition metals in Groups IVa, Va and VIa of the Periodic Table: and 0.1–50 volume % of a second conductive material consisting of SiC; the first conductive material and the second conductive material serving to form paths for electric conduction.

DETAILED DESCRIPTION OF THE INVENTION

Figure 1:
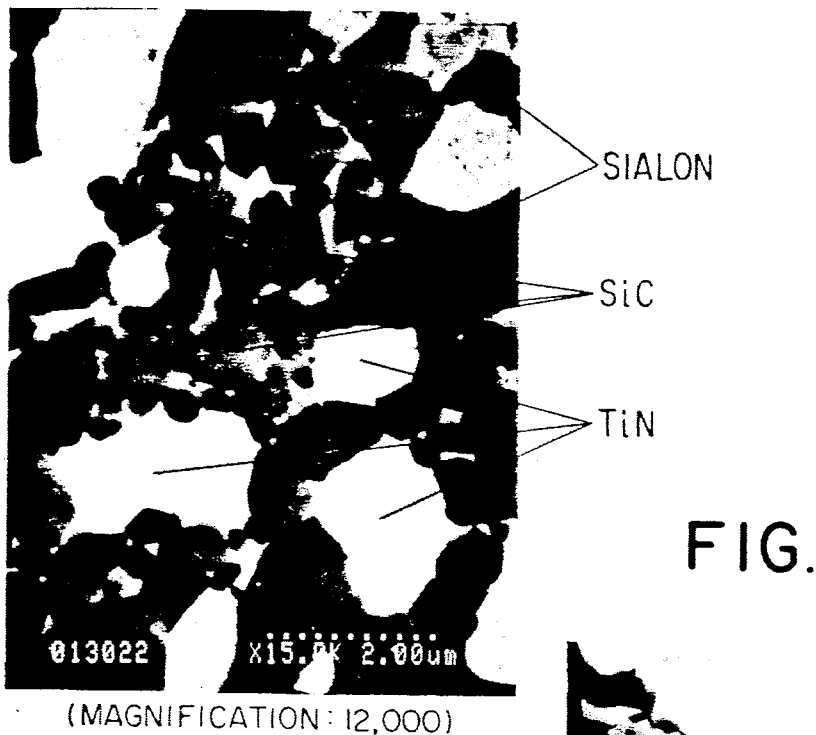
FIG. 1 is photomicrograph (magnification: 12,000) of the sialon sintered body containing 20 volume % of TiN and 20 volume % of SiC taken by a scanning electron microscope.

The conductive ceramic sintered body according to the present invention has a matrix of a silicon ceramic material. Specifically, the silicon ceramic material may be a silicon nitride based on $\alpha$- or $\beta$-Si$_3$N$_4$; $\beta$-sialon shown by the general formula:

$$Si_{6-z}Al_zO_zH_{8-z}$$

wherein $0 < z \leq 4.2$; $\alpha$-sialon shown by the general formula:

$$M_x(Si,Al)_{12}(O,N)_{16}$$

wherein $x<2$, and M represents Li, Mg, Ca, Y or a rare earth element except for La and Ce: or their composite ceramics. Incidentally, in the case of β-sialon, when z is less than 1, it has excellent strength at room temperature as well as at high temperature, and also high hardness and toughness.

The first conductive material is one or more conductive compounds selected from carbides, nitrides, oxides and their composite compounds of the transition metals of Groups IVa, Va and VIa of the Periodic Table. The first conductive material may be one of these compounds or a combination of two or more of these conductive compounds. When TiN is used as the first conductive material, the preferred results can be obtained with respect to sinterability, strength, oxidation resistance, etc.

The composite compounds mean carbonitrides, oxinitrides, composite nitrides, composite carbides, etc.

The first conductive material is added to the ceramic sintered body in an amount of 10-70 volume %. When it is less than 10 volume %, sufficient conductivity cannot be obtained, and when it exceeds 70 volume %, the sinterability is lowered, and high-temperature characteristics inherent in the silicon nitride and the sialon are deteriorated. The preferred amount of the first conductive material is 15-50 volume %.

The second conductive material is SiC which has much higher electric resistivity than the first conductive materials. Specifically, SiC has electric resistivity of as high as $10-10^4 \Omega \cdot cm$ or so. Accordingly, when added to the silicon ceramic material together with the first conductive materials, conductive paths are formed in the ceramic sintered body between the first conductive materials, between the second conductive material, and between the first and second conductive materials, and the overall electric resistivity of the ceramic sintered body is relatively higher than in a case where only the first conductive materials are added. Specifically in the case of TiN and SiC, TiN/TiN contact is diluted by TiN/SiC contact and SiC/SiC contact. Further, in addition to the above effect of SiC of increasing the total electric resistivity, what also is an important effect is the reduction of the variation or unevenness of the electric resistivity in the resulting ceramic sintered body. This is due to the fact that a denser network of electrically conductive paths is formed, for instance, not only by contact between TiN and TiN, but also by contact between TiN and SiC and between SiC and SiC. Therefore, when both of the first and second conductive materials are added, relatively high electric resistance with little variation or unevenness can be obtained.

Besides, SiC is a compound with an excellent oxidation resistance. This serves to improve the oxidation resistance of the sintered body when added together with the first conductive materials.

The amount of SiC added is 0.1-50 volume % based on the sintered body. When it is less than 0.1 volume %, the effects of the present invention cannot be achieved. On the other hand, when it exceeds 50 volume %, the sinterability decreases, making it difficult to obtain a dense sintered body. The preferred amount of SiC is 3-30 vol volume %.

The conductive ceramic sintered body of the present invention can be produced as follows:

First, $Si_3N_4$ powder, $Al_2O_3$ powder, AlN powder, oxide powder of IIIa elements (including rare earth elements), MgO powder, etc. are mixed in such proportions as to provide a desired silicon nitride and/or sialon. Then, added to this mixture is the first conductive material consisting of one or more conductive compounds selected from carbides, nitrides, oxides and these composite compounds of transition metals of Group IVa, Va and VIa of the Periodic Table, and the second conductive material of SiC powder is added in proper amounts.

Ceramic powder used in the present invention may have an average particle size of 0.1-10 μm to achieve the good results. Specifically it is desired that the $Si_3N_4$ powder has an average particle size of 0.1-3 μm, that the first conductive material powder has an average particle size of 0.1-5 μm, and that the second conductive material has an average particle size of 0.1-10 μm.

After mixing and pressing, the pressed grain body is sintered in a non-oxidizing atmosphere. The sintering can be conducted by pressureless sintering, gas-pressure sintering, hot isostatic pressing, hot pressing, etc. The sintering atmosphere is desirably a non-oxidizing atmosphere, and it is specifically an $N_2$ atmosphere, a pressurized $N_2$ gas atmosphere, a reduced-pressure $N_2$ gas atmosphere, an inert gas atmosphere including $N_2$, etc.

Incidentally, as the carbides, nitrides, oxides or their composite compounds of transition metals of Groups IVa, Va and VIa of the Periodic Table, any starting materials which may be converted to them during the sintering process can be used.

Further, after sintering, a hot isostatic pressing treatment can be conducted to further improve the properties of the sintered ceramic body, or any heat treatment can be conducted to crystallize the grain boundary phases.

The present invention will be explained in further detail by means of the following Examples.

EXAMPLE 1

$Si_3N_4$ powder (particle size: 0.7 μm, α-ratio: 93%), $Y_2O_3$ powder (particle size: 1 μm, purity: 99.99%), AlN powder (particle size: 1 μm), and $Al_2O_3$ powder (particle size: 0.5 μm, purity: 99.5%) were mixed in such proportions as to provide β-sialon having the formula: $Si_{6-z}Al_zO_zN_{8-z}$ in which the value of z is 0.4 ($Y_2O_3$ content is 6 weight %). Each of the resulting mixtures was mixed with 20-30 volume % of TiN powder and 0-20 volume % of SiC powder to provide a starting material powder mixture. It was then pressed and sintered in a nitrogen atmosphere at 1750° C. and 1 atm for 3 hours. The resulting sintered body had a relative density, electric resistivity and its variations shown in Table 1.

The electric resistivity and variation thereof were determined for each sample from maximum electric resistivities ρmax and minimum electric resistivities ρmin of 20 sintered bodies arbitrarily selected from a large number of product lots according to the following equations:

$$\text{Electric resistivity} = \frac{(\rho max + \rho min)}{2} \; (\Omega \cdot cm)$$

$$\frac{\text{Variation of}}{\text{Electric resistivity}} = \frac{(\rho max - \rho min)}{(\rho max + \rho min)} \times 100(\%)$$

The maximum electric resistivities and the minimum electric resitivities were measured on a sintered body surface exposed by machining the sintered body by 10 mm in depth.

TABLE 1

| Sample No. | Ceramic Composition (volume %) | | | Relative Density (%) | Electric Resistivity ($\Omega \cdot cm$) | Variation of Electric Resistivity (%) |
|---|---|---|---|---|---|---|
| | Sialon | TiN | SiC | | | |
| 1 | 80 | 20 | 0 | 99.7 | $5.3 \times 10^6$ | ±75 |
| 2 | 75 | 20 | 5 | 99.5 | $1.4 \times 10^3$ | ±40 |
| 3 | 70 | 20 | 10 | 99.0 | $4.8 \times 10^2$ | ±35 |
| 4 | 60 | 20 | 20 | 98.2 | $7.6 \times 10^2$ | ±45 |
| 5 | 77.5 | 22.5 | 0 | 99.6 | $2.0 \times 10^{-1}$ | ±57 |
| 6 | 72.5 | 22.5 | 5 | 99.4 | $5.1 \times 10^{-2}$ | ±24 |
| 7 | 67.5 | 22.5 | 10 | 98.8 | $7.6 \times 10^{-2}$ | ±17 |
| 8 | 62.5 | 22.5 | 20 | 97.9 | $1.7 \times 10^{-1}$ | ±30 |
| 9 | 75 | 25 | 0 | 99.5 | $7.8 \times 10^{-3}$ | ±40 |
| 10 | 70 | 25 | 5 | 99.2 | $4.7 \times 10^{-3}$ | ±18 |
| 11 | 65 | 25 | 10 | 98.6 | $5.2 \times 10^{-3}$ | ±15 |
| 12 | 55 | 25 | 20 | 97.3 | $6.1 \times 10^{-3}$ | ±23 |
| 13 | 70 | 30 | 0 | 99.4 | $3.0 \times 10^{-3}$ | ±25 |
| 14 | 65 | 30 | 5 | 99.2 | $2.4 \times 10^{-3}$ | ±13 |
| 15 | 60 | 30 | 10 | 98.5 | $2.8 \times 10^{-3}$ | ±6 |
| 16 | 50 | 30 | 20 | 97.2 | $3.3 \times 10^{-3}$ | ±8 |

Note:
Sample Nos. 1, 5, 9 and 13: Conventional ceramics
Sample Nos. 2-4, 6-8, 10-12 and 14-16: Present invention As is clear from Table 1, the ceramic sintered bodies of the present invention show extremely small variations of electric resistivity.

EXAMPLE 2

The same powder as in Example 1 was used to provide a starting material powder mixture of 58–78 volume % of β-sialon powder in which z was 0.3 and $Y_2O_3$ content was 7 weight %, 22 volume % of TiN powder and 0–20 volume % of SiC powder. After mixing and pressing, sintering was conducted in a nitrogen atmosphere at 1750° C. and 1 atm for 7 hours. The resulting sintered body was 17 mm×17 mm×17 mm, and 30 sintered bodies were produced under each condition. Each sintered body was cut through the center, and its electric resistivity at a center was measured, and its variations were determined by the above-described equation.

The compositions, densities, electric resistivities and their variations are shown in Table 2.

TABLE 2

| Sample No. | Ceramic Composition (volume %) | | | Relative Density (%) | Electric Resistivity ($\Omega \cdot cm$) | Variation of Electric Resistivity (%) |
|---|---|---|---|---|---|---|
| | Sialon | TiN | SiC | | | |
| 1 | 78 | 22 | 0 | 99.6 | $8.2 \times 10^{-1}$ | ±60 |
| 2 | 73 | 22 | 5 | 99.4 | $4.6 \times 10^{-1}$ | ±27 |
| 3 | 68 | 22 | 10 | 98.9 | $2.1 \times 10^{-1}$ | ±19 |
| 4 | 63 | 22 | 15 | 98.4 | $2.9 \times 10^{-1}$ | ±27 |
| 5 | 58 | 22 | 20 | 97.8 | $3.4 \times 10^{-1}$ | ±35 |

Note:
Sample No. 1: Conventional ceramic
Sample Nos. 2-5: Present invention

As is clear from Table 2, even in a range where the electric resistivity is as high as $10^{-1}\Omega.cm$, its variations are extremely lowered by the addition of both TiN and SiC in proper amounts.

EXAMPLE 3

This Example was conducted to investigate the variations of electric resistivities of a sintered body in each portion thereof.

The starting material powder having the same composition as in Example 1 was used, mixed and pressed, and then sintered in a nitrogen atmosphere at 1850° C. and 5 atm for 5 hours.

The resulting sintered body was measured with respect to electric resistivity ($\Omega.cm$) at various depths (mm) from the surface. The results are shown in Table 3.

TABLE 3

| Sample No. | Ceramic Composition (volume %) | | | Electric Resistivity ($\Omega \cdot cm$) Measured at Depth of | | | | |
|---|---|---|---|---|---|---|---|---|
| | Sialon | TiN | SiC | 2 mm | 4 mm | 6 mm | 8 mm | 10 mm |
| 1 | 77.5 | 22.5 | 0 | $0.7 \times 10^{-1}$ | $1.0 \times 10^{-1}$ | $1.6 \times 10^{-1}$ | $1.8 \times 10^{-1}$ | $2.0 \times 10^{-1}$ |
| 2 | 72.5 | 22.5 | 5 | $3.5 \times 10^{-2}$ | $4.2 \times 10^{-2}$ | $4.9 \times 10^{-2}$ | $5.0 \times 10^{-2}$ | $5.1 \times 10^{-2}$ |
| 3 | 67.5 | 22.5 | 10 | $6.9 \times 10^{-2}$ | $7.2 \times 10^{-2}$ | $7.4 \times 10^{-2}$ | $7.5 \times 10^{-2}$ | $7.6 \times 10^{-2}$ |
| 4 | 62.5 | 22.5 | 15 | $7.8 \times 10^{-2}$ | $8.0 \times 10^{-2}$ | $8.1 \times 10^{-2}$ | $8.3 \times 10^{-2}$ | $8.3 \times 10^{-2}$ |
| 5 | 57.5 | 22.5 | 20 | $0.8 \times 10^{-1}$ | $1.4 \times 10^{-1}$ | $1.5 \times 10^{-1}$ | $1.6 \times 10^{-1}$ | $1.7 \times 10^{-1}$ |

Note:
Sample Nos. 1 and 2: Conventional ceramics
Sample Nos. 3-5: Present invention As is clear from Table 3, the variation of electric resistivity in the sintered body is extremely lowered by the addition of both TiN and SiC in proper amounts.

EXAMPLE 4

$Si_3N_4$ powder (particle size: 0.7 μm, α-ratio: 93%), $Y_2O_3$ powder (particle size: 1 μm, purity: 99.99%), AlN powder (particle size: 1 μm), and $Al_2O_3$ powder (particle size: 0.5 μm, purity: 99.5%) were mixed in such proportions as to provide β-sialon in which the value of z was 0.4 ($Y_2O_3$ content was 6 weight %). Each of the resulting mixtures was mixed with 25 volume % of TiN powder and 0–60 volume % of SiC powder to provide a starting material powder mixture. It was then pressed and sintered at 1750° C. for 5 hours in a nitrogen atmosphere at 1 atm. The properties of the resulting sintered bodies are shown in Table 4.

TABLE 4

| Sample[1] No. | Ceramic Composition (volume %) | | | Relative Density (%) | Electric Resistivity ($\Omega \cdot cm$) | Bending Strength (kgf/mm²) | Weight Gain[2] by Oxidation (mg/cm²) |
|---|---|---|---|---|---|---|---|
| | Sialon | TiN | SiC | | | | |
| 1 | 75 | 25 | 0 | 99.7 | $7.1 \times 10^{-3}$ | 85 | 1.5 |

TABLE 4-continued

| Sample[1] No. | Ceramic Composition (volume %) | | | Relative Density (%) | Electric Resistivity ($\Omega \cdot$ cm) | Bending Strength (kgf/mm$^2$) | Weight Gain[2] by Oxidation (mg/cm$^2$) |
|---|---|---|---|---|---|---|---|
| | Sialon | TiN | SiC | | | | |
| 2 | 65 | 25 | 10 | 99.3 | $4.7 \times 10^{-3}$ | 83 | 0.8 |
| 3 | 55 | 25 | 20 | 98.7 | $5.4 \times 10^{-3}$ | 82 | 0.6 |
| 4 | 45 | 25 | 30 | 97.4 | $2.5 \times 10^{-2}$ | 80 | 0.7 |
| 5 | 35 | 25 | 40 | 96.5 | $4.2 \times 10^{-2}$ | 77 | 0.9 |
| 6 | 25 | 25 | 50 | 94.4 | $6.9 \times 10^{-2}$ | 71 | 1.1 |
| 7 | 15 | 25 | 60 | 92.1 | $1.1 \times 10^{-1}$ | 60 | 1.4 |

Note
[1]Sample Nos. 1 and 7: Conventional ceramics
Sample Nos. 2-6: Present invention
[2]Expressed by the difference (mg/cm$^2$) between an initial weight and a weight after kept in the air at 1100° C. for 48 hours.

As is clear from Table 4, oxidation resistance is improved by the addition of SiC. In addition, when the addition of SiC added exceeds 50 volume %, the sinterability decreases, resulting in lower relative densities.

EXAMPLE 5

The same Si$_3$N$_4$ powder, Y$_2$O$_3$ powder, AlN powder as in Example 1 were used, and they were mixed such that the amount of Y$_2$O$_3$+9AlN was 20 mol %. Added to each of the resulting mixture were 20 volume % of SiC and 5-80 volume % of TiN. The resulting starting material powder was pressed and sintered in an nitrogen atmosphere at 1730° C. and 5 atm for 4 hours. The properties of the resulting sintered bodies are shown in Table 5.

TABLE 5

| Sample[1] No. | Ceramic Composition (volume %) | | | Relative Density (%) | Electric Resistivity ($\Omega \cdot$ cm) | High-Temp.[2] Strength (kgf/mm$^2$) | Weight Gain[3] by Oxidation (mg/cm$^2$) |
|---|---|---|---|---|---|---|---|
| | Sialon | SiC | TiN | | | | |
| 1 | 75 | 20 | 5 | 99.4 | $> 10^{13}$ | 73 | 0.05 |
| 2 | 65 | 20 | 15 | 99.2 | $5.3 \times 10^5$ | 71 | 0.18 |
| 3 | 60 | 20 | 20 | 99.1 | $2.8 \times 10^3$ | 70 | 0.3 |
| 4 | 50 | 20 | 30 | 99.0 | $2.2 \times 10^{-3}$ | 68 | 0.7 |
| 5 | 40 | 20 | 40 | 98.7 | $6.5 \times 10^{-4}$ | 67 | 1.5 |
| 6 | 30 | 20 | 50 | 98.4 | $2.3 \times 10^{-4}$ | 64 | 2.3 |
| 7 | 20 | 20 | 60 | 98.1 | $7.1 \times 10^{-5}$ | 61 | 3.8 |
| 8 | 10 | 20 | 70 | 94.3 | $6.7 \times 10^{-5}$ | 53 | 5.9 |
| 9 | 0 | 20 | 80 | 91.8 | $1.2 \times 10^{-4}$ | 38 | 12.7 |

Note
[1]Sample Nos. 1 and 9: Conventional ceramics Sample Nos. 2-8: Present invention.
[2]Bending Strength at 1100° C.
[3]Expressed by the difference (mg/cm$^2$) between an initial weight and a weight after keeping in the air at 1100° C. for 48 hours.

Table 5 shows that when the amount of TiN is 5 volume %, the electric resistivity is too high, and when it is 80 volume %, the sintered body has reduced high-temperature strength. Thus, it has been found that within the range of the present invention, well balanced properties can be achieved.

Next, the sintered body (Sample No. 3) containing 20 volume % of TiN and 20 volume % of SiC was observed with respect to its microstructure by a scanning electron microscope and a transmission electron microscope. FIG. 1 shows the microstructure observed by SEM (magnification: 12,000), and FIG. 2 shows the microstructure observed by TEM (magnification: 40,000).

Figure 2:
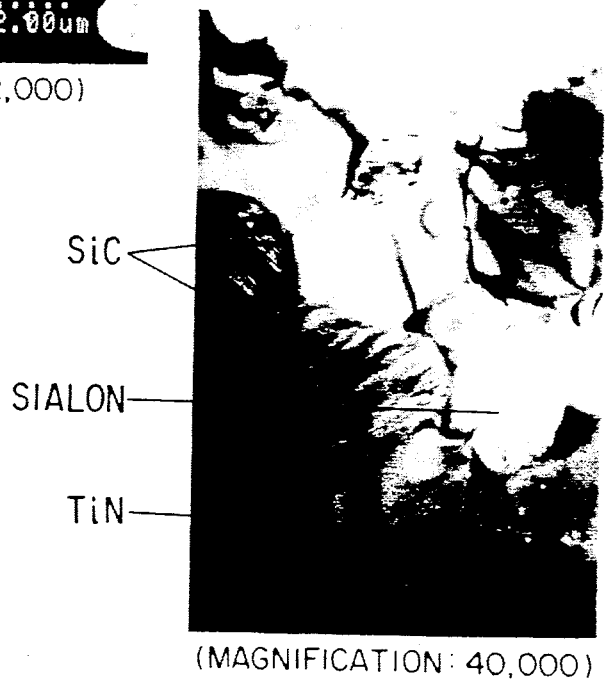
FIG. 2 is a photomicrograph (magnification: 40,000) of the sialon sintered body containing 20 volume % of TiN and 20 volume % of SiC taken by a transmission electron microscope.

It is shown by FIGS. 1 and 2 that the SiC particles exist discretely without reacting with the sialon particles and the TiN particles, and that not only the TiN/TiN contact but also TiN/SiC contact and SiC/SiC contact exist in the sintered body to form conductive paths.

It may be presumed that the addition of both SiC and TiN serves to produce a network of conductive paths by the formation of TiN/TiN contact, TiN/SiC contact and SiC/SiC contact, thereby reducing the variation of the electric resistivity throughout the entire region of the sintered body.

In addition, since SiC has electric resistivities on the level of $10^1$-$10^4 \Omega$.cm which is extremely higher than that of nitrides, carbides, oxides and their composite compounds of the transition metals of Groups IVa, Va and VIa of the Periodic Table, the electric resistivity of the entire sintered body is not likely to be lowered by the addition of both SiC and the carbides, nitrides, etc. of the transition metals of Groups IVa, Va and VIa, despite the fact that the total amount of conductive materials are increased.

Thus, the sintered body with high electric resistivity having small variations can be obtained.

EXAMPLE 6

This Example was conducted to confirm the effects of the present invention when Si$_3$N$_4$ and sialon ceramics were used as matrix materials.

The same powder as in Example 1 and MgO powder (average particle size: 1.0 μm) were used to provide Si$_3$N$_4$ and sialon ceramics of various compositions. 60 volume % of each Si$_3$N$_4$ or sialon powder was mixed with 15 volume % of SiC and 25 volume % of TiN to provide a starting material powder mixture. Incidentally, only 25 volume % of TiN was added in Comparative Examples. After pressing, sintering was conducted under each sintering condition. The properties of the resulting sintered bodies are shown in Table 6.

Sintering conditions:

Sample Nos. 1 and 2: 1700° C.×3 hours at 1 atm in $N_2$
Sample Nos. 3 and 4: 1750° C.×1 hour by hot press at 200 kgf/cm², 1 atm in $N_2$
Sample Nos. 5-10: 1800° C.×3 hours at 9 atm in $N_2$
Sample Nos. 11 and 12: 1730° C.×5 hours at 2 atm in $N_2$ der mixture was mixed with 30 volume % of powders of various conductive compounds selected from carbides, nitrides, etc. of transition metals of Groups IVa, Va and VIa (average particle size: 1.5-3.0 μm), and 15 volume % of SiC powder, and pressed. Sintering was then conducted in a nitrogen atmosphere at 1700-1800° C. and 1

TABLE 6

| Sample[1] No. | Ceramic Composition (volume %) | | | | Relative Density (%) | Electric Resistivity (Ω · cm) | Variation of Electric Resistivity (%) | Weight Gain[2] by Oxidation (mg/cm²) |
|---|---|---|---|---|---|---|---|---|
| | Sialon | $Si_3N_4$ | TiN | SiC | | | | |
| 1 | 60 | — | 25 | 15 | 98.9 | $8.5 \times 10^{-3}$ | ±17 | 0.6 |
| 2 | 75 | — | 25 | 0 | 99.0 | $9.4 \times 10^{-3}$ | ±43 | 1.0 |
| 3 | — | 60 | 25 | 15 | 99.8 | $4.9 \times 10^{-3}$ | ±13 | 1.8 |
| 4 | — | 75 | 25 | 0 | 99.8 | $6.2 \times 10^{-3}$ | ±36 | 3.2 |
| 5 | 60 | — | 25 | 15 | 99.5 | $6.6 \times 10^{-3}$ | ±16 | 0.8 |
| 6 | 75 | — | 25 | 0 | 99.6 | $8.0 \times 10^{-3}$ | ±39 | 1.7 |
| 7 | 60 | — | 25 | 15 | 99.7 | $6.5 \times 10^{-3}$ | ±14 | 0.9 |
| 8 | 75 | — | 25 | 0 | 99.7 | $7.9 \times 10^{-3}$ | ±45 | 2.0 |
| 9 | 60 | — | 25 | 15 | 99.7 | $6.7 \times 10^{-3}$ | ±14 | 1.2 |
| 10 | 75 | — | 25 | 0 | 99.8 | $9.5 \times 10^{-3}$ | ±37 | 2.3 |
| 11 | — | 60 | 25 | 15 | 99.3 | $7.9 \times 10^{-3}$ | ±15 | 1.0 |
| 12 | — | 75 | 25 | 0 | 99.4 | $9.8 \times 10^{-3}$ | ±40 | 2.2 |

Note
[1]Sample Nos. 1, 3, 5, 7, 9 and 11: Present invention
Sample Nos. 2, 4, 6, 8, 10 and 12: Conventional ceramics
Sample Nos. 1 and 2: β-sialon, z = 1.5, $Y_2O_3$ = 6 weight %
Sample Nos. 3 and 4: $Si_3N_4$-3 wt % MgO
Sample Nos. 5 and 6: Y-α-sialon, α = 100%
Sample Nos. 7 and 8: Y-α/β-sialon, α = 50%
Sample Nos. 9 and 10: Y-α/β-sialon, α = 25%
Sample Nos. 11 and 12: $Si_3N_4$-2% Mgo-2% $Al_2O_3$-3% $Y_2O_3$ (by weight)
[2]Expressed by difference (mg/cm²) between an initial weight and a weight after kept in the air at 1100° C. for 48 hours.

It is clear from Table 6 that various $Si_3N_4$ and sialon ceramics can be used to achieve the object of the present invention.

atm for 3-6 hours. The properties of the resulting sintered bodies are shown in Table 7.

TABLE 7

| Sample[1] No. | Ceramic Composition (volume %) | | | | Relative Density (%) | Electric Resistivity (Ω · cm) | Variation of Electric Resistivity (%) | Weight Gain[2] by Oxidation (mg/cm²) |
|---|---|---|---|---|---|---|---|---|
| | Sialon | First Conductive Material Compound | Content | SiC | | | | |
| 1 | 55 | TiC | 30 | 15 | 98.3 | $7.6 \times 10^{-3}$ | ±12 | 3.3 |
| 2 | 70 | TiC | 30 | 0 | 98.5 | $9.8 \times 10^{-3}$ | ±29 | 3.8 |
| 3 | 55 | ZrC | 30 | 15 | 96.8 | $9.2 \times 10^{-3}$ | ±13 | 5.0 |
| 4 | 70 | ZrC | 30 | 0 | 97.1 | $1.7 \times 10^{-2}$ | ±32 | 5.3 |
| 5 | 55 | ZrN | 30 | 15 | 99.2 | $5.8 \times 10^{-3}$ | ±11 | 5.2 |
| 6 | 70 | ZrN | 30 | 0 | 99.3 | $7.1 \times 10^{-3}$ | ±28 | 5.9 |
| 7 | 55 | $TiC_{0.5}N_{0.5}$ | 30 | 15 | 97.1 | $7.9 \times 10^{-3}$ | ±15 | 4.6 |
| 8 | 70 | $TiC_{0.5}N_{0.5}$ | 30 | 0 | 97.4 | $9.2 \times 10^{-3}$ | ±30 | 5.1 |
| 9 | 55 | (Ti,Ta)C[3] | 30 | 15 | 96.3 | $1.3 \times 10^{-2}$ | ±17 | 4.0 |
| 10 | 70 | (Ti,Ta)C[3] | 30 | 0 | 96.7 | $2.5 \times 10^{-2}$ | ±31 | 4.6 |
| 11 | 55 | HfC | 30 | 15 | 98.8 | $6.5 \times 10^{-3}$ | ±11 | 6.3 |
| 12 | 70 | HfC | 30 | 0 | 98.9 | $8.0 \times 10^{-3}$ | ±30 | 6.9 |
| 13 | 55 | NbN | 30 | 15 | 97.9 | $8.7 \times 10^{-3}$ | ±14 | 7.3 |
| 14 | 70 | NbN | 30 | 0 | 98.1 | $9.9 \times 10^{-3}$ | ±32 | 7.8 |
| 15 | 55 | $TiO_{0.1}N_{0.9}$ | 30 | 15 | 99.2 | $2.9 \times 10^{-3}$ | ±13 | 2.1 |
| 16 | 70 | $TiO_{0.1}N_{0.9}$ | 30 | 0 | 99.3 | $4.2 \times 10^{-3}$ | ±24 | 2.8 |
| 17 | 55 | $TiO_{0.3}N_{0.7}$ | 30 | 15 | 99.1 | $3.6 \times 10^{-3}$ | ±14 | 1.9 |
| 18 | 70 | $TiO_{0.3}N_{0.7}$ | 30 | 0 | 99.2 | $4.8 \times 10^{-3}$ | ±26 | 2.4 |
| 19 | 55 | $TiO_2$ | 30 | 15 | 96.0 | $4.7 \times 10^{-3}$ | ±12 | 3.0 |
| 20 | 70 | $TiO_2$ | 30 | 0 | 96.4 | $6.1 \times 10^{-3}$ | ±29 | 3.5 |

Note
[1]Sample Nos. 1, 3, 5, 7, 9, 11, 13, 15, 17, 19: Present invention
Sample Nos. 2, 4, 6, 8, 10, 12, 14, 16, 18, 20: Conventional ceramics
[2]Expressed by the difference (mg/cm²) between an initial weight and a weight after kept in the air at 1100° C. for 48 hours.
[3]Weight ratio of Ti/Ta is 7:3.

EXAMPLE 7

This Example was conducted to confirm the effects of the present invention by using various conductive compounds.

The same powder as in Example 1 and was used to provide a powder mixture for β-sialon in which z=0.5 and $Y_2O_3$ was 7 weight %. 55 volume % of each pow- It is clear from Table 7 that the present invention can be conducted by using various types of conductive compounds as the first conductive material.

EXAMPLE 8

This Example shows the electric resistivity which varies depending upon the amounts of TiN and SiC added.

The same powder mixture for β-sialon as in Example 1 was used, and it was mixed with various amounts of TiN powder (average particle size: 2.0 μm) and SiC powder (average particle size: 1.0 μm), and sintered in an N₂ atmosphere at 1750° C. and 1 atm for 6 hours. Each of the resulting sintered bodies was measured with respect to electric resistivity. The results are shown in FIG. 3.

Figure 3:
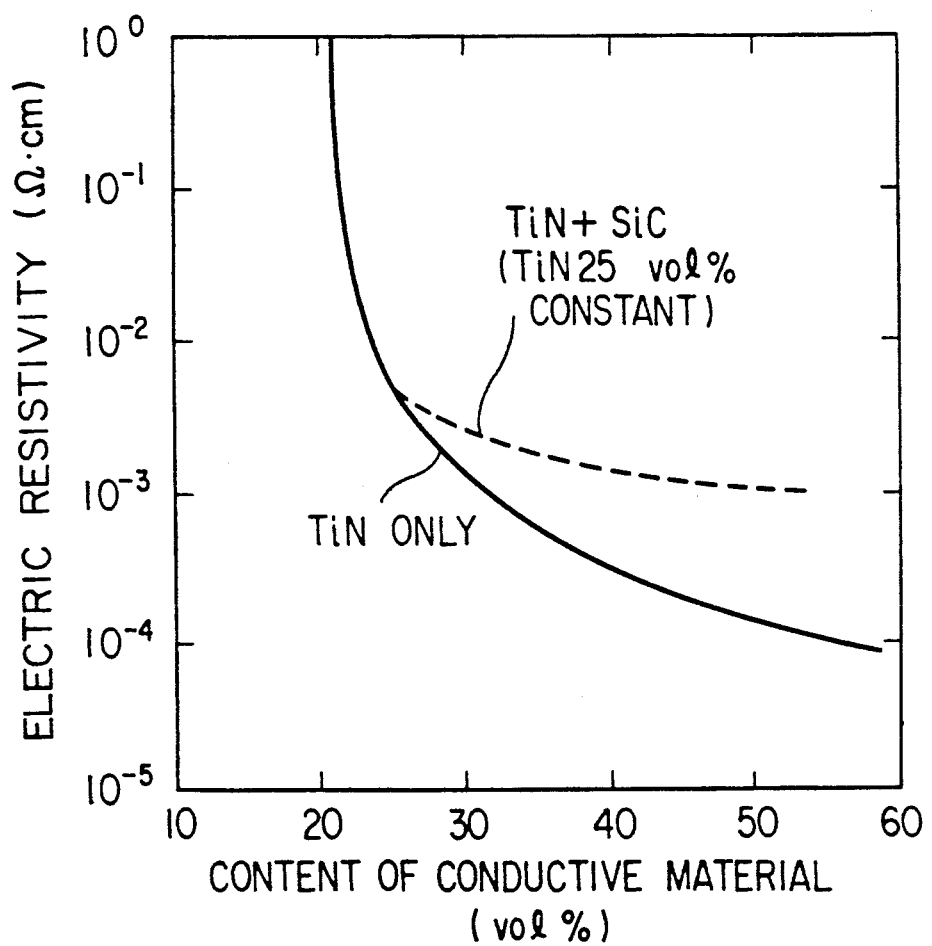
FIG. 3 is a graph showing the relations between the contents of conductive materials (TiN+SiC) and electric resistivity in the sintered body.

It is clear from FIG. 3 that the addition of SiC increases the electric resistivity.

It has been verified from the above Examples that silicon nitride-base sintered bodies containing the first conductive material consisting of one or more conductive compounds selected from carbides, nitrides, oxides and their composite compounds of transition metals of Groups IVa, Va and VIa of the Periodic Table, and the second conductive material consisting of SiC have electric resistivity whose variations can be reduced greatly in the range of a high resistance as compared to conventional sintered bodies containing no SiC. In addition, the sintered body of the present invention has an improved oxidation resistance.

According to the present invention, the biggest problem with the conductive silicon nitride or sialon sintered bodies that is large variation of electric resistivity in the range of a high resistance can be solved, and also the oxidation resistance of the sintered body can be improved. The conductive ceramic sintered body of the present invention can be used in various applications utilizing electric properties in the range of a high resistance, such as heaters, etc. Further, it can be used at a higher temperature than the conventional one.

What is claimed is:

1. A conductive ceramic sintered body consisting essentially of:
   a sialon-based ceramic material as a matrix said material represented by the formula $Si_{6-z}Al_zO_zN_{8-z}$, where $z \leq 0.5$;
   15-70 volume %, based on the amount of said matrix material, of a first conductive material which consists of one or more conductive compounds selected from carbides, nitrides, and their composite compounds of transition metals in Groups IVa, Va and VIa of the Periodic Table; and
   3-50 volume %, based on the amount of said matrix material, of a second conductive material consisting of SiC; said body having a microstructure comprised of particles of said first and second conductive materials distributed in said matrix, said first conductive material and said second conductive material serving to form paths for electric conduction so that said body has a stable electric resistivity, and said body having high strength, high hardness, and high toughness.

2. A conductive ceramic sintered body formed by preparing a powder mixture consisting essentially of a sialon-based ceramic matrix material powder represented by the formula $Si_{6-z}Al_zO_zN_{8-z}$, where $z \leq 0.5$, said matrix material powder having an average particle size of about 0.1 μm to about 3 μm, 15-70 volume %, based on the amount of said matrix material powder, of a first conductive material powder which consists of one or more conductive compounds selected from carbides, nitrides, and their composite compounds of transition metals in Groups IVa, Va, and VIa of the Periodic Table, said first conductive material powder having an average particle size of about 0.1 μm to about 5 μm, and 3-50 volume %, based on the amount of said matrix material powder, of a second conductive material powder consisting of SiC powder having an average particle size of about 0.1 μm to about 10 μm; and sintering said powder mixture to form said body, said first conductive material and said second conductive material forming paths for electric conduction so that said body has a stable electric resistivity, and said body having high strength, high hardness, and high toughness.

3. The conductive ceramic sintered body according to claim 2, wherein said first conductive material is 15-50 volume % TiN.

4. The conductive ceramic sintered body according to claim 3, wherein said second conductive material is 3-30 volume % SiC.

5. A conductive ceramic sintered body, said body consisting essentially of a matrix consisting essentially of a sialon-based ceramic material represented by the formula $Si_{6-z}Al_zO_zN_{8-z}$, where $z \leq 0.5$; about 15 to about 70 volume %, based on the amount of said matrix material, of a first conductive material, said first conductive material consisting essentially of TiN; and about 3 to about 50 volume %, based on the amount of said matrix material, of a second conductive material, said second conductive material consisting essentially of SiC, said body having a microstructure comprised of particles of said first and second conductive materials dispersed in said matrix, said first conductive material and said second conductive material serving to form paths for electric conduction so that said body has s stable electric resistivity, and said body having high strength, high hardness, and high toughness.

6. The conductive ceramic sintered body according to claim 5, wherein the amount of TiN is about 15 to about 50 volume % and the amount of SiC is about 5 to about 15 volume %.

7. The conductive ceramic sintered body according to any one of claims 1, 2 and 5, wherein said conductive paths are formed by contact between first conductive material phases, between second conductive material phases, and between said first and second conductive material phases.

* * * * *

UNITED STATES PATENT AND TRADEMARK OFFICE
CERTIFICATE OF CORRECTION

PATENT NO. : 5,066,423
DATED : November 19, 1991
INVENTOR(S) : Yutaka Kubo et al.

It is certified that error appears in the above-identified patent and that said Letters Patent is hereby corrected as shown below:

Claim 5, line 40, column 12, "dispersed" should be --distributed--;
        line 43, "s" should be --a--.

Signed and Sealed this

Sixteenth Day of March, 1993

Attest:

STEPHEN G. KUNIN

Attesting Officer     Acting Commissioner of Patents and Trademarks